(12) United States Patent
Langer et al.

(10) Patent No.: US 8,919,811 B2
(45) Date of Patent: Dec. 30, 2014

(54) KNEE AIRBAG WITH CLAMSHELL HOUSING

(71) Applicants: Julia Langer, Frankfurt (DE); Jeannette Wazinski, Limburg (DE)

(72) Inventors: Julia Langer, Frankfurt (DE); Jeannette Wazinski, Limburg (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 13/858,777

(22) Filed: Apr. 8, 2013

(65) Prior Publication Data

US 2013/0270802 A1    Oct. 17, 2013

Related U.S. Application Data

(60) Provisional application No. 61/624,107, filed on Apr. 13, 2012.

(51) Int. Cl.
*B60R 21/2165* (2011.01)
*B60R 21/206* (2011.01)

(52) U.S. Cl.
CPC .......... *B60R 21/206* (2013.01); *B60R 21/2165* (2013.01)
USPC ..................... 280/728.3; 280/730.2

(58) Field of Classification Search
CPC .......................... B60R 21/2165; B60R 21/206
USPC .................. 280/730.1, 732, 728.3, 728.2
See application file for complete search history.

(56) References Cited

U.S. PATENT DOCUMENTS

| | | | | |
|---|---|---|---|---|
| 7,175,195 B2 * | 2/2007 | Morita | ...................... | 280/730.1 |
| 7,261,318 B2 * | 8/2007 | Enders | .......................... | 280/732 |
| 7,370,879 B2 * | 5/2008 | Hotta et al. | ................. | 280/728.2 |
| 7,568,723 B2 * | 8/2009 | Remley et al. | ............. | 280/728.2 |
| 7,568,724 B2 * | 8/2009 | Kutchey et al. | ............ | 280/728.3 |
| 7,878,532 B2 * | 2/2011 | Sasaki et al. | ............... | 280/730.1 |
| 8,186,707 B2 * | 5/2012 | Matsushima et al. | ...... | 280/730.1 |
| 8,292,322 B2 * | 10/2012 | Thomas | ..................... | 280/728.2 |
| 8,297,650 B2 * | 10/2012 | Enders | ........................ | 280/730.1 |
| 8,360,464 B2 * | 1/2013 | Enders | ........................ | 280/730.1 |
| 8,454,050 B2 * | 6/2013 | Schorle et al. | ............. | 280/728.2 |
| 8,459,715 B2 * | 6/2013 | Iwamoto et al. | ........... | 296/37.12 |
| 8,500,155 B2 * | 8/2013 | Enders | ........................ | 280/728.2 |
| 2005/0116449 A1 * | 6/2005 | Enders | ........................ | 280/730.1 |
| 2009/0058052 A1 * | 3/2009 | Ford et al. | .................. | 280/730.1 |
| 2012/0049488 A1 * | 3/2012 | Enders | ........................ | 280/728.3 |

* cited by examiner

*Primary Examiner* — Nicole Verley (74) *Attorney, Agent, or Firm* — Markell Seitzman (57) ABSTRACT

A knee airbag module (200) has an airbag (201), an inflator (206) and a housing (202). The knee airbag module (200) is a self-contained assembly for mounting to a vehicle frame part (108) under the instrument panel (106). The housing (202) contains the airbag (201) and inflator (206) within a hollow interior of the housing formed by a first housing part (300) and a second housing part (302). The first and second housing parts are joined together. The housing (202) includes a deployable door cover (220) formed in the second part that articulates about a hinge (222) as the airbag (201) is inflated. The airbag (201), when inflated, extends upward relative to the lower portion of the instrument panel (106) between the instrument panel (106) and an occupant's knees (120). The door cover (220) is partially separated from the second housing part (302) by a tear seam (320). The hinge (222) is near a portion of the tear seam (320).

7 Claims, 8 Drawing Sheets

KNEE AIRBAG WITH CLAMSHELL HOUSING

TECHNICAL FIELD

The present invention relates generally to air bags inflatable during a side impact crash and more particularly to a novel arrangement for a knee airbag. The present invention claims priority to provisional U.S. application 61/624,107 filed Apr. 13, 2012.

BACKGROUND OF THE INVENTION

Knee airbag assemblies for protecting an occupant's knees are typically incorporated into the instrument panel or dash assembly. Most typical knee airbag modules are incorporated into and behind a decorative feature of the dashboard. This makes the assembly of the airbag more complex and costly.

An objective of the present invention is to provide a complete knee airbag module adapted to mount under the dashboard as a complete self-contained assembly. This allows for a simpler less expensive assembly and replacement once activated.

SUMMARY OF THE INVENTION

A knee airbag module has an airbag, an inflator and a housing. The knee airbag module is a self-contained assembly for mounting to a vehicle frame part under the instrument panel. The housing contains the airbag and inflator within a hollow interior of the housing formed by a first housing part and a second housing part. The first and second housing parts are joined together. The housing includes a deployable door cover formed in the second part that articulates about a hinge as the airbag is inflated. The airbag, when inflated, extends upward relative to the lower portion of the instrument panel between the instrument panel and an occupant's knees. The door cover is partially separated from the second housing part by a tear seam. The hinge is near a portion of the tear seam.

The tear seam includes three major portions extending across two opposing cover sides of the second part and across a longer cover side of the second part. The tear seam further includes two transition portions, one transition portion extends from one of the cover sides to the hinge, the other transition portion extends from the opposite cover side to the hinge and wherein on airbag deployment the major portions tear and thereafter the transition portions tear permitting the door cover to rotate about the hinge. The rotatable door cover is a portion of the second housing between the tear seam and the hinge.

Preferably, the first housing part and second housing part are snapped together. During airbag deployment the two housing parts remain locked together in a locking engagement. The knee airbag module further has a snap in feature, wherein the lower edge of each side of the first housing part includes an extending rib, each rib includes a plurality of rectangular openings. The second housing part also includes a resilient extending rib. Extending upwardly from each resilient extending rib is a plurality of flexible fingers. The distal end of each finger has an enlarged head. Each head includes a sloping face, vertical face and inwardly extending face, which together form a hook to engage those portions of the first housing part forming the rectangular openings. As the two housing parts are joined together, the narrow tip of the head enters one of the openings. Upon engagement of the sloping face, the finger moves rearward permitting the head to move through the opening; after the head is completely through the opening the resilient finger moves forward to achieve the snap-in configuration shown.

DETAILED DESCRIPTION OF THE DRAWINGS

Figure 1:
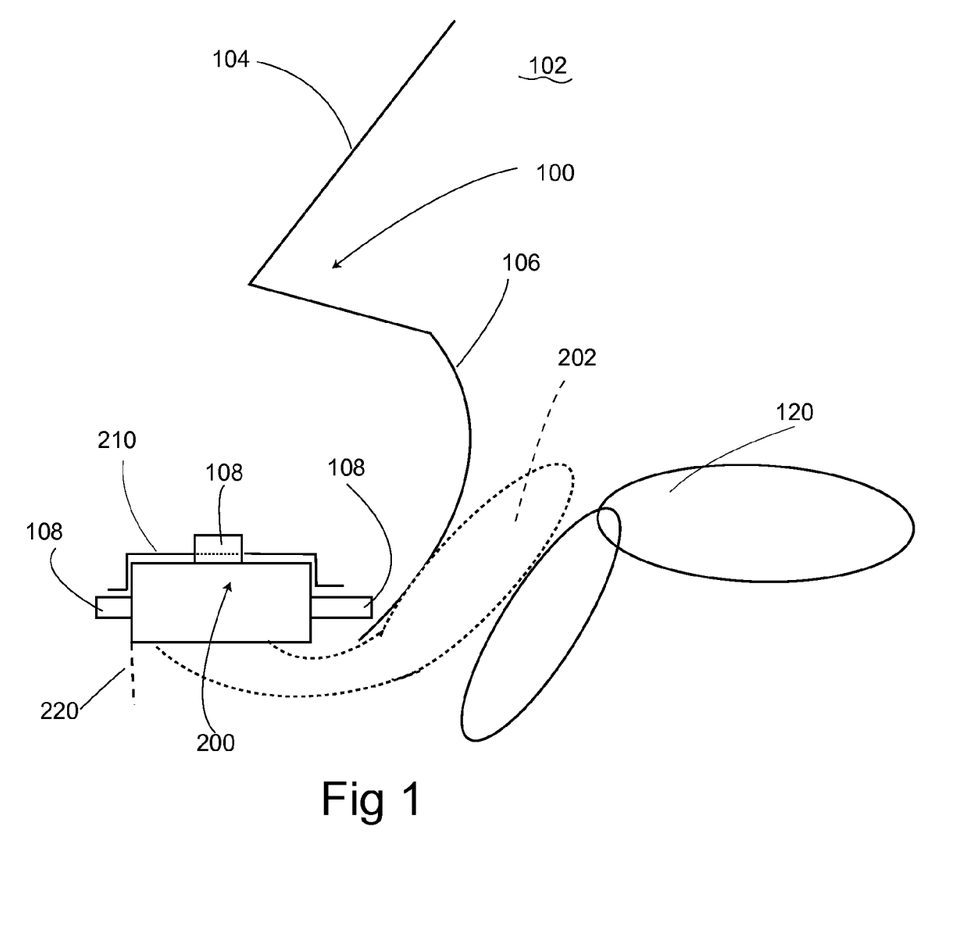
FIG. 1 shows the placement of the knee airbag module below a typical instrument panel.
Figure 2:
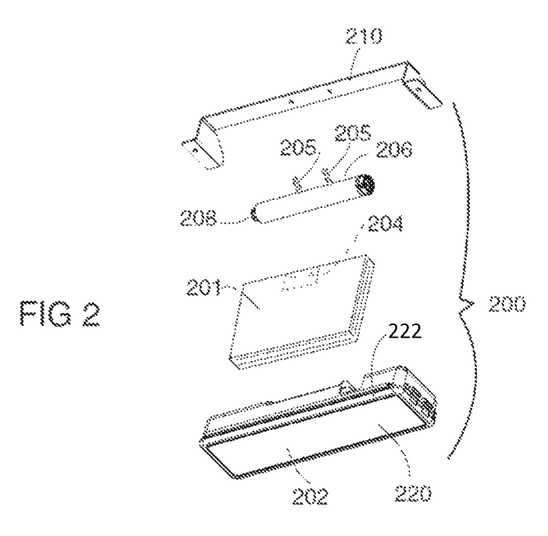
FIG. 2 is an exploded view of the present invention.

FIG. 1 illustrates a portion of a passenger compartment 100 of a vehicle 102. The windshield 104 is located above part of the instrument panel 106. A knee airbag module 200 of the present invention is shown secured to various frame parts 108 of the vehicle 102. The knee airbag module 200 is a self-contained assembly for mounting to the vehicle under the frame 108 under the instrument panel 106. FIG. 2 illustrates the major components of the airbag module 200. Module 200 comprises a housing 202 and an airbag or airbag unit 201, diagrammatically illustrated and typically folded to fit within the housing. Airbag 201 includes a neck 204 in which inflator 206 extends. Inflator 206 includes exit ports 208 and is configured to mate with the airbag 201 and provide inflation gas into the neck 204 to inflate the airbag. The inflator 206 is secured by clamps or fasteners to the housing and to a mounting bracket 210. The bracket 210 is provided to secure the housing to the various frame components 108 of the vehicle. The housing 202 includes a deployable door cover 220 that articulates about the hinge 222. Reference is briefly made to FIG. 1 which shows door 220 in its deployed condition (see dashed lines), with airbag 201 extending upward relative to the lower portions of the instrument panel between the instrument panel and the occupant's knees 120.

Figure 3:
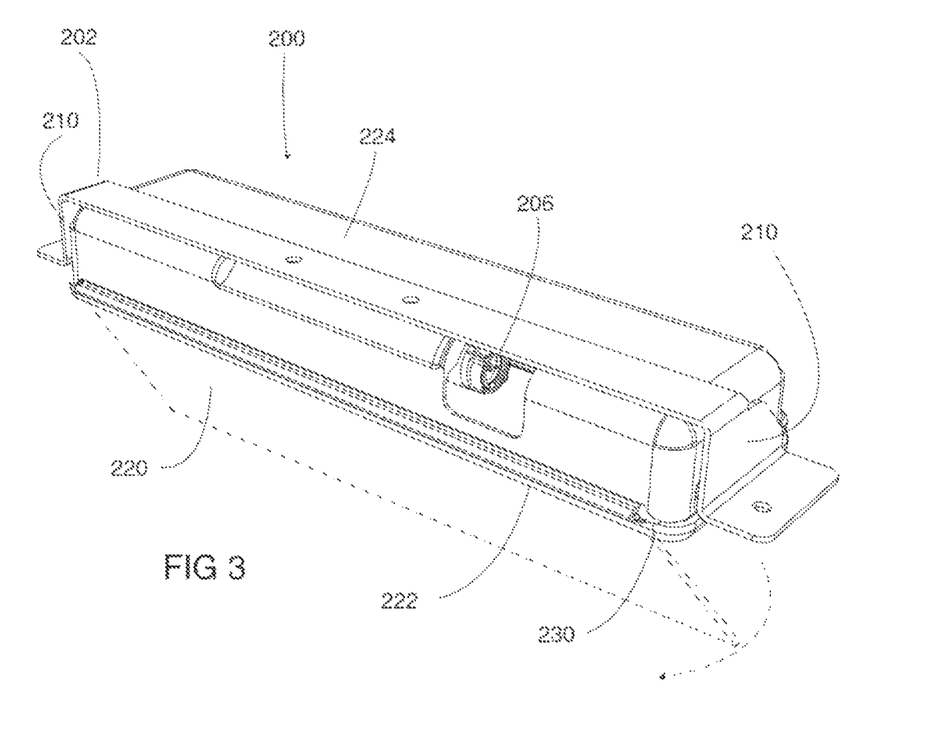
FIG. 3 is an isolated view of a housing.

Reference is briefly made to FIG. 3 which illustrates airbag module 200 in a configuration for mounting frame 108. Frame 210 is shown secured to the housing 202, with the inflator 206 and airbag 201 within the housing. As will be seen in the figures below, the hinge 222 is positioned near a portion of the tear seam 230 of the housing. The (housing further includes a top 224 shown in its mounted position and four sides 410, 412, 414 and 416 as seen in FIGS. 5b and 5c.

Figure 4:
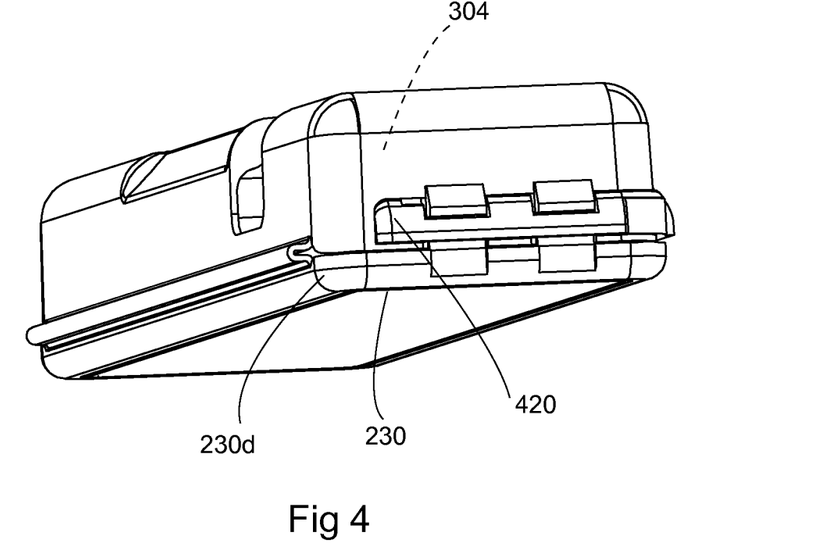
FIG. 4 is an exploded view showing a hinge.
Figure 4A:
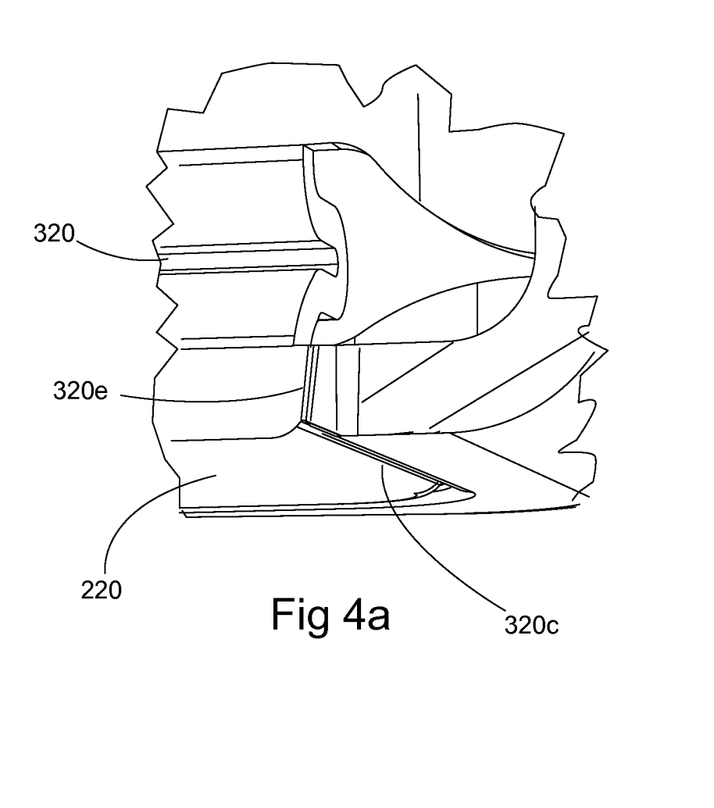
FIG. 4a shows another view of the hinge looking outward from the interior of the housing.
Figure 5:
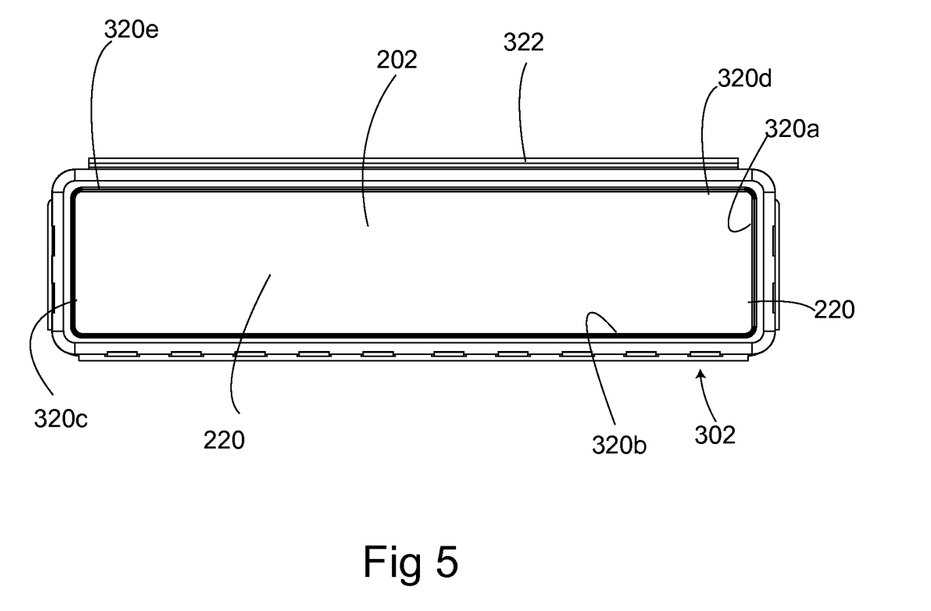
FIGS. 5, 5a, 5b and 5c show various views of the housing.
Figure 5A:
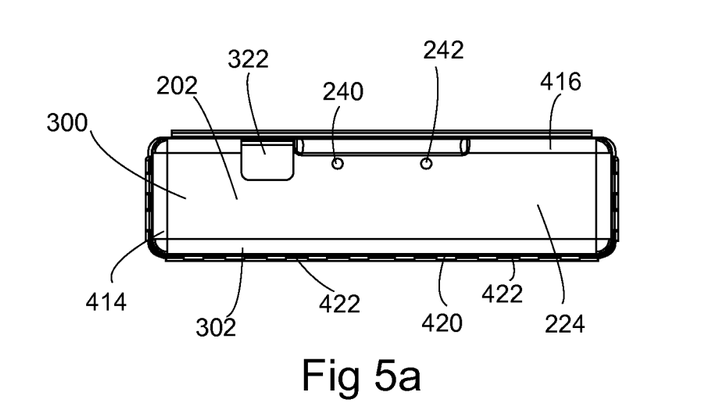
Figure 5B:
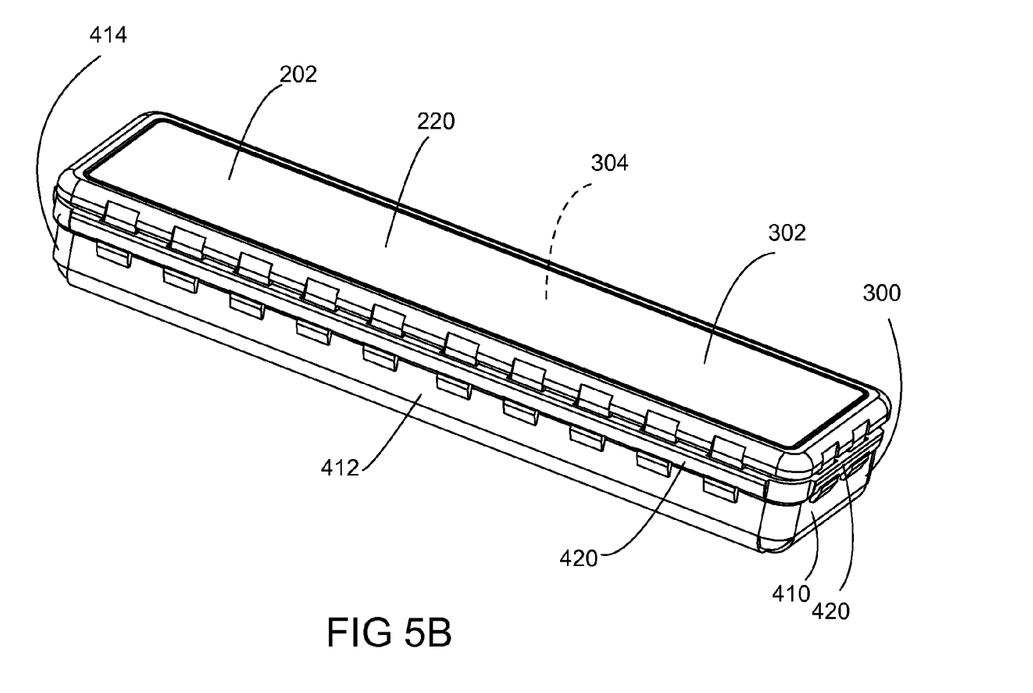
Figure 5C:
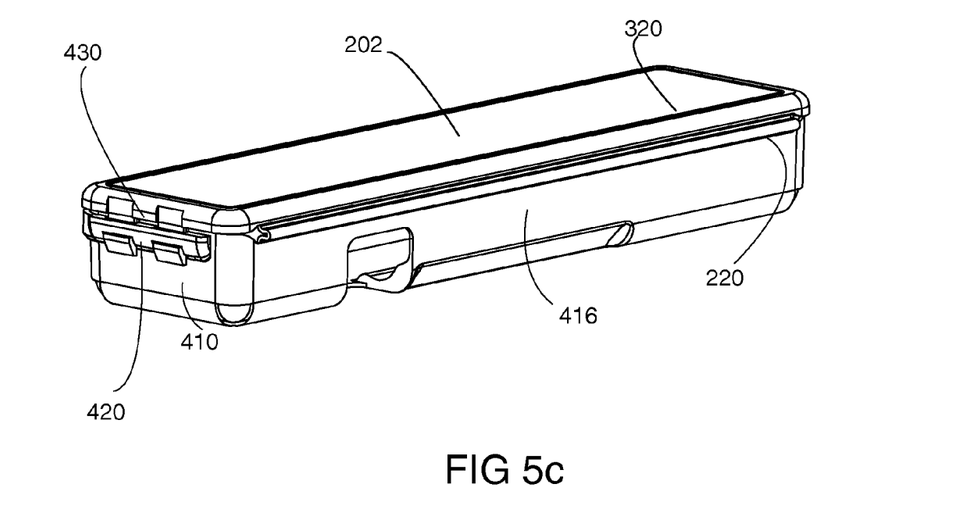

Reference is made to FIGS. 5-5c and to FIG. 4 which show further features of the present invention. FIGS. 5-5c show various views of the housing 202. The housing includes a larger first housing part 300 and a smaller second housing part 302 that are joined together by snap features 400 shown in FIG. 6. Numerals 410-416 show the sides of the module 200 and are used to show the individual sides of each of the first and second housing parts 300 and 302. The snap-in feature extends along the three common sides 410, 412, and 414 of the two housing parts. The fourth housing side 416 of each of the two housing parts are joined together by the hinge 222 forming the clamshell housing. When these two housing parts snap together they create a hollow interior 304. FIG. 5 shows the door 220 formed in the second housing part 302. The door 220 is separated from the rest of the housing part 302 by a tear seam. The tear seam 320 includes three major portions 320a, 320b and 320c extending across the two opposing smaller sides of part 302 and across the longer side of part 302. The tear seam 320 includes two transition portions 320d and 320e which extend from cover sides 320a and 320c to the hinge which is more clearly shown in FIGS. 4, 4a and 5.

Figure 7:
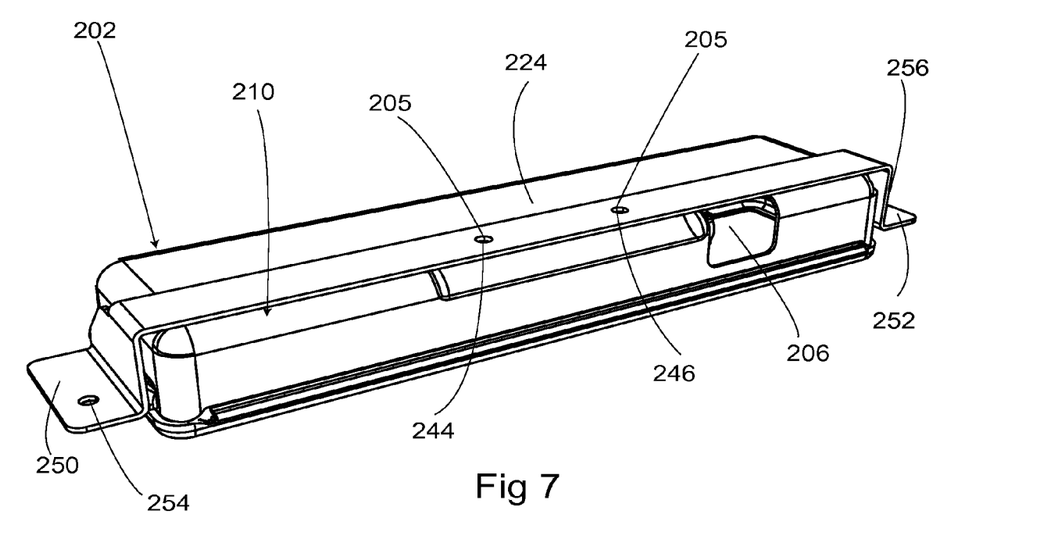
FIGS. 7 and 7a show the housing and related frame.
Figure 7A:
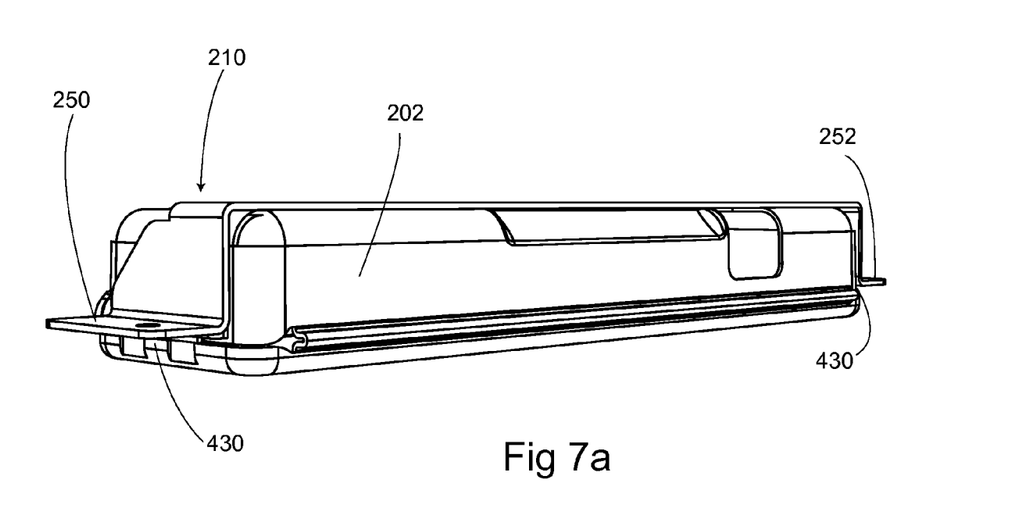

Reference is briefly made to FIG. 5a which shows the top 224 of the cover. The top includes two mounting holes 240 and 242. Reference is also made to FIG. 7 which shows bracket 210 in place upon the top 224 of the housing 202. In this configuration mounting bolts 205 from the inflator extend through the housing and through holes 244 and 246 of the bracket. Bracket 210 also includes side flanges 250 and 252, each with an opening 254 and 256 to facilitate mounting to the frame 108. A portion of inflator 206 is shown in FIG. 7. FIG. 7a shows another view of the housing 202 and bracket 210.

Figure 6:
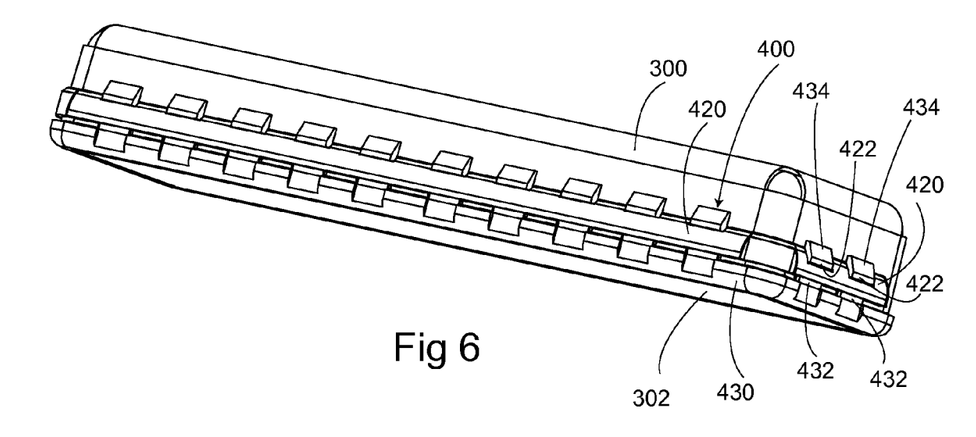
FIGS. 6, 6a and 6b illustrate the snap-in features of the housing.
Figure 6A:
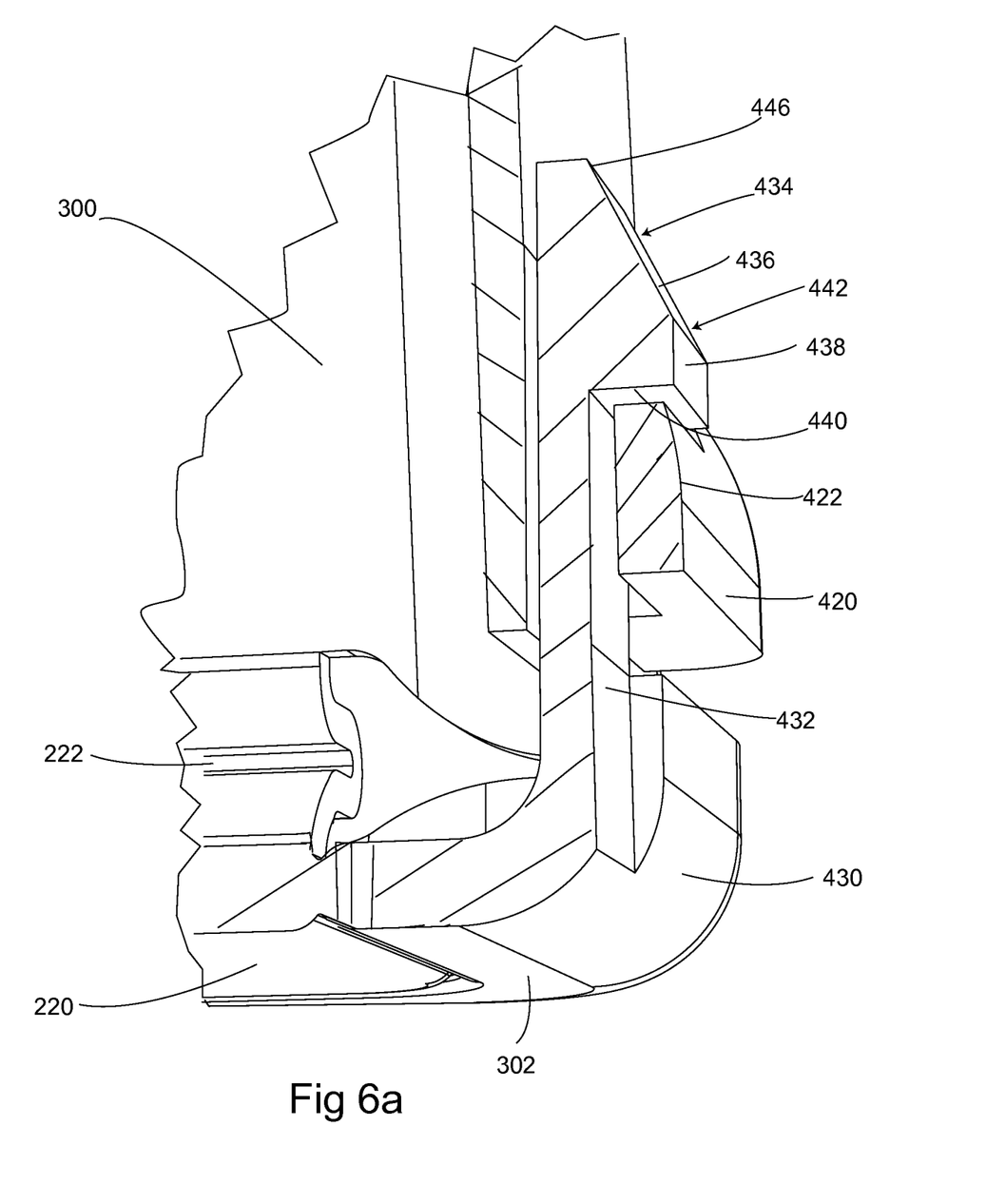
Figure 6B:
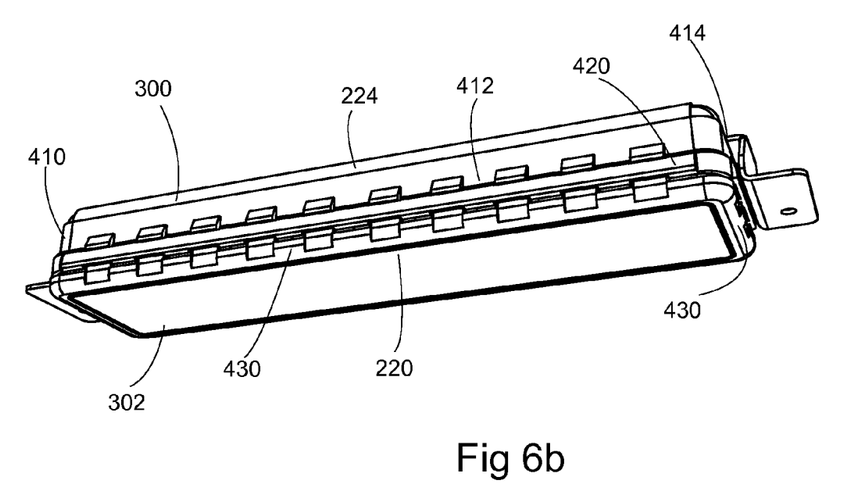

FIGS. 6, 6a and 6b show the construction of the snap-in features 400. The lower edge of each of the sides 410, 412 and 416 of the larger first housing part 300 includes an extending rib 420. Each rib 420 includes a plurality of rectangular openings 422. Each side 410, 412 and 414 of the second housing part 302 also includes a resilient extending rib 430. Extending upwardly (as shown in the drawings) from each resilient extending rib 430 is a plurality of flexible fingers 432. The distal end of each finger 432 has an enlarged head 434. Each head includes a sloping face 436, vertical face 438 and inwardly extending face 440, which together form a hook 442 to engage those portions of the first housing part 300 forming the rectangular openings 422. As the two housing parts 300 and 302 are joined together, the narrow tip 446 of head 434 enters one of the openings 422. Upon engagement of the sloping face with the housing 302, the finger 432 moves rearward permitting the head to move through opening 422. After the head is completely through the opening the resilient finger moves forward to achieve the snap-in configuration shown (see FIG. 6a).

During operation, a crash signal is generated by a sensor and controller to activate the airbag 202. As the bag inflates with gas it bears upon the door 220 causing the tear seam 320 to rip. The tear seam will initially rip across sections 320a, b and c. Thereafter sections 320d and e tear, permitting the door to rotate about the hinge 222. Subsequently, the inflating airbag exits the housing and is positioned as shown in FIG. 1. During airbag deployment the two housing parts 300 and 302 remain locked together as the snap-in features remain in a locking engagement.

As illustrated and described above, the knee airbag module forms a self-contained unit designed to be mounted and fit under the instrument panel wherein the airbag deploys from the module under the instrument panel and is inflated as it extends upward relative to the lower portion of the instrument panel between the instrument panel and the occupant's knees.

Many changes and modifications in the above-described embodiment of the invention can, of course, be carried out without departing from the scope thereof. Accordingly, that scope is intended to be limited only by the scope of the appended claims.

What is claimed is:

1. A knee airbag with clamshell housing module comprises:
    an airbag;
    an inflator;
    a one-piece housing, the housing containing the airbag and inflator within a hollow interior of the housing formed by a first housing part and a second housing part, the first and second housing parts being locked together along four common sides and remain locked together in locking engagement during airbag deployment, along three common sides by a locking engagement snap in feature and where each first and second housing parts are joined by a hinge extending along a fourth housing side, the housing includes a deployable rotatable door cover formed as a portion of the second part between the hinge and a tear seam and being partially separated from the second part by the tear seam which upon deployment tears permitting the door cover to rotate and articulate about the hinge as the airbag is inflated extending upward relative to the lower portion of the instrument panel between the instrument panel and an occupant's knees.

2. The knee airbag with clamshell housing module of claim 1 wherein the hinge is near a portion of the tear seam.

3. The knee airbag with clamshell housing module of claim 2 wherein the tear seam includes three major portions extending across two opposing cover sides of the second part and across a longer cover side of the second part.

4. The knee airbag with clamshell housing module of claim 3 wherein the tear seam includes two transition portions, one transition portion extends from one of the cover sides to the hinge, the other transition portion extends from the opposite cover side to the hinge and wherein on airbag deployment the major portions tear and thereafter the transition portions tear permitting the door cover to rotate about the hinge.

5. The knee airbag with clamshell housing module of claim 1 wherein the first housing part and second housing part are snapped together along the three common sides.

6. The knee airbag with clamshell housing module of claim 5 wherein during airbag deployment the two housing parts remain locked together in a locking engagement along the three common sides and the hinge along the fourth common housing side.

7. The knee airbag with clamshell housing module of claim 6 further comprises:
    a snap in feature, wherein the lower edge of each side of the first housing part includes an extending rib, each rib includes a plurality of rectangular openings, the side of the second housing part further includes a resilient extending rib extending upwardly, from each resilient extending rib are a plurality of flexible fingers, the distal end of each finger has an enlarged head, each head includes a sloping face, vertical face and inwardly extending face, which together form a hook to engage those portions of the first housing part forming the rectangular openings, as the two housing parts are joined together, the narrow tip of the head enters one of the openings, upon engagement of the sloping face, the finger moves rearward permitting the head to move through the opening, after the head is completely through the opening the resilient finger moves forward to achieve the snap-in configuration.

* * * * *